Figure 1:
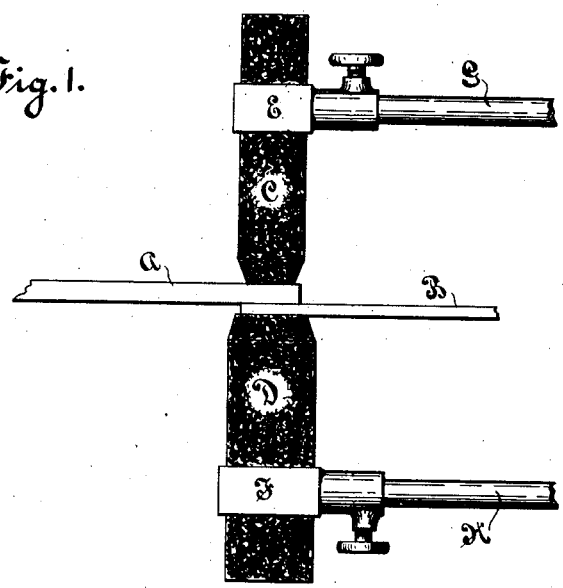

(No Model)

D. W. PAYNE & E. DIVEN.
ART OF WELDING AND BRAZING.

No. 584,120. Patented June 8, 1897.

Witnesses
A. S. Diven
H. H. Mills.

Inventors
David W. Payne
and Eugene Diven
by Eugene Diven
Attorney

UNITED STATES PATENT OFFICE.

DAVID W. PAYNE AND EUGENE DIVEN, OF ELMIRA, NEW YORK.

ART OF WELDING AND BRAZING.

SPECIFICATION forming part of Letters Patent No. 584,120, dated June 8, 1897.

Application filed October 26, 1896. Serial No. 610,103. (No specimens.)

*To all whom it may concern:*

Be it known that we, DAVID W. PAYNE and EUGENE DIVEN, citizens of the United States, residing at Elmira, in the county of Chemung and State of New York, have invented a new and useful Improvement in the Art of Welding and Brazing, of which the following is a specification.

Our invention relates to an improved method of producing welded or brazed joints between metal pieces, and is particularly applicable where the parts to be united are in the form of comparatively thin plates, strips, &c., which are to be fastened together flatwise and where the metal of one part has a higher temperature of fusion than the metal of the other part or where, the parts being of the same temperature of fusion, one part is thinner than the other—that is to say, where the metals to be joined have different characteristics. The difficulty in making such a joint arises from the nature of the union and of the pieces to be united. In many cases it is not practical to heat the parts separately and afterward unite them, nor will the now common method of butt-welding by electricity accomplish the end, although metals having different characteristics are readily united in this way. If the parts are placed together in the position in which they are to be united and heat applied to the joint in any of the ordinary ways, a proper union will not be accomplished, inasmuch as the metal having the lower point of fusion will become burned or melted before the other is brought to its required temperature, or where the metals of the parts are the same and one part thinner than the other the thinner piece will reach the welding or brazing point before the larger mass in the other part has attained the requisite temperature, and will thereafter become injured, if not destroyed, from excess of heat. Much more difficult still is it to unite the parts when the one having the lower point of fusion is at the same time thinner than the other. Many articles there are in which, by reason of the above difficulties, it has hitherto been impossible to unite the component parts by welded or brazed joints, although such joints are greatly to be desired.

The object of our improvements is therefore to provide a method by which metal pieces having the characteristics described may be applied to each other in the desired position and while thus *in situ* have heat applied to them in such manner and degree as to bring the parts to their respective welding or brazing temperatures at the same time.

To carry our invention into effect, we make use, preferably, of the electric current, since by its means and the ease of its manipulation we are enabled most readily to apply the required amount of heat to the respective parts at the required difference in degree.

In the accompanying drawings we have shown by way of illustration two ways in which our method may be accomplished by electrical apparatus.

In Figure 1, A and B represent edge views of two flat pieces of metal which are to be united by a welded or brazed joint, (and hereinafter we shall only use the terms "welded joint" or "welding," meaning thereby to include as well a brazed joint or brazing.) A is the thicker piece, or the one having the higher temperature of fusion, and B the thinner piece, or the one having the lower temperature of fusion. C and D are two electrodes connected by suitable clamps E and F, provided with binding-posts, to which are attached the wires G and H, which lead to a dynamo or converter. The work is held together by and between the electrodes, and the current passes across the two metals at their juncture from electrode to electrode, the novelty lying in the relative construction of these electrodes and the manner of manipulating the electric current passing through them. In the first place, in our preferred method we make the electrodes of refractory material, such as compressed carbon, and of such internal resistance to the current that the electrodes themselves are heated to a high degree, especially at their surfaces which are in contact with the metals. The heat from the electrodes is thus imparted to the metals by conduction from the electrodes where they are in contact, in contradistinction to heating the metals by their own resistance to the current passing through them; but in order to accomplish the object in view one of the electrodes—namely, that next the thicker metal or the metal having the higher temperature of fusion—must be heated to a higher degree than the other, or, in other words, the two electrodes must impart to their adjacent metals such relative amounts of heat that the two pieces shall arrive at their respective welding temperatures at approximately the same time. One way to heat one electrode to a higher degree than the other is to have that electrode present a greater resistance to the current than the other, and this may be accomplished either by making said electrode of greater density than the other, or of a different material which presents a greater resistance, or of a smaller cross-sectional area when the two are of the same material and density. In the figure we have shown one electrode, C, smaller than the other. Suppose A to be a plate of steel, and B a plate of copper and thinner than A. It is very evident that if heat in equal intensity were applied to both sides of the joint the copper would be melted or burned before the steel could be sufficiently heated; but by means of the difference in the electrodes the heat is so applied to the parts that the steel will be brought up to the required temperature before the copper can be injured, the copper being heated more slowly by the lower temperature imparted to the larger electrode D. A little experiment will readily determine the relative construction of the electrodes necessary to do the work under any given conditions as to size, shape, and difference in the metals of the pieces to be united. As soon as the parts are brought to their relative requisite temperatures the current is turned off and the joint allowed to cool or set, after which the clamping pressure is removed and a most clean and perfect union results.

Figure 2:
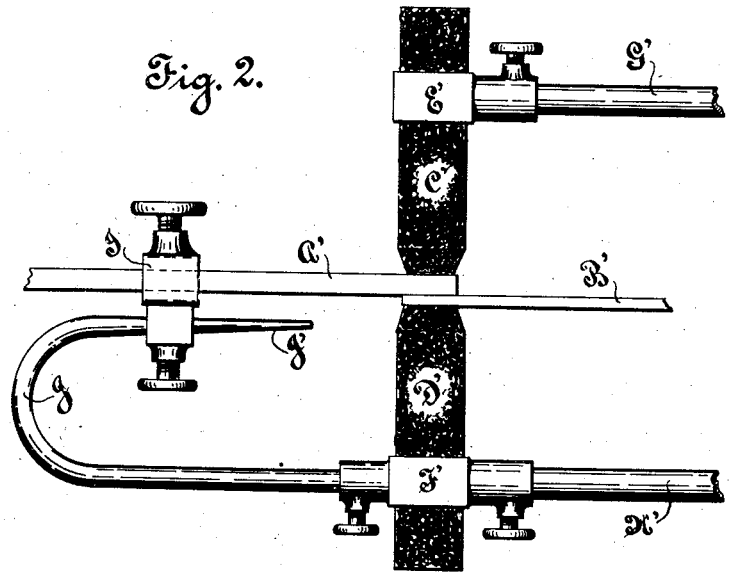

In Fig. 2 we have shown a modified form of the apparatus in which one set of electrodes may be made to do the work under a great variety of different conditions. Here we have shown the electrodes of the same size, and they may be of like materials and density. To the piece A', which is to receive the higher degree of heat, we attach a clamp I near the juncture and from a binding-post on this clamp run a wire J to a binding-post on the clamp F'. This wire may be smaller in sectional area than the feed-wires G' and H' and is provided at J' with a tapering end which may be moved in and out through the binding-post on I. This we term a "regulator," inasmuch as part of the current from or to electrode C' is shunted by it around electrode D' and piece B', so that D', and by it B', is heated to a less degree than C' and A'. By altering the resistance to the passage of the current through J, which is done by changing the position of the taper end in the binding-post on I so as to reduce or increase the area of the conduit from the post to the clamp F' and through it to main wire H', it is evident that the amount of current shunted around the electrode D' may be varied at will and more or less heat imparted to this electrode, accordingly as differing conditions of the work to be performed require. The wire J should be of platinum, German silver, or other suitable metal in order that it may not be burned out by the passing current. We have described this simple form of regulator merely by way of illustration. Other and more approved ways of accomplishing the same result will readily appear to the skilled electrician. This regulator may also be applied to the form of apparatus described in relation to Fig. 1.

We propose to use a current of low voltage and high amperage, but do not limit ourselves to this. By this means a joint of this nature is very quickly made and presents an exceedingly neat appearance when completed. The electrodes may be shaped in a variety of ways to accommodate many different conditions in the nature of the work to be done. In fact, much work can be readily and quickly done by this method which it is now exceedingly difficult and even in many instances impossible to accomplish by means hitherto employed.

A work to which our method is particularly applicable is that of welding flat copper bonding-strips directly to the rails of electric railways. By the use of the electrodes in the manner above described the heat is localized immediately at the place of juncture, with that difference in degree upon the sides of the joint which is necessary to bring the steel of the rail and the copper of the bonding-strip to their respective welding temperatures at the same time, and a perfect joint is very quickly and readily made.

While describing our method as preferably carried out by means of electricity in the manner above set forth, we do not limit ourselves to the precise instrumentalities described nor to electricity only as the source of heat.

The heat as applied in our method of procedure may be derived from other sources, such as oxyhydrogen or other gas flames, it being only necessary to have such control over the heat sources on either side of the joint that the heat derived therefrom shall be concentrated upon the metals at the opposite sides of the joint and the respective heat intensities at the points of concentration varied as the nature of the metals may require.

We are aware that in the process of butt-welding bars or tubes of dissimilar metals or dissimilar in size have been united end to end by properly proportioning the respective distances to which the two metals project from the clamps; but it is quite evident that this process cannot be applied to flat pieces of metal which are to be united flatwise. In our method of procedure heat sources external to the pieces to be joined are so proportioned as to their relative intensities that the heat conducted from them to the pieces on either side of the joint or seam shall be that which is requisite to bring the two pieces to their respective welding-points at approximately the same time. By the use of the electrodes in the manner herein described the heating effect of the electric current is concentrated to the desired degree in the electrodes themselves and from them imparted in the proper proportion to the two pieces held between them, these pieces acting only to complete the circuit for the current and not deriving their respective welding temperatures from the passage of the current through them, as is the case in butt-welding.

What we claim as our invention, and desire to secure by Letters Patent, is—

1. The method of welding or brazing together flatwise metal pieces having different characteristics, which consists in holding the pieces together at the seam or joint, and concentrating heat from two external heat sources upon the metals at opposite sides of the joint, the relative thermal intensities at the points of concentration being so proportioned that the metals of the parts shall be brought to their respective welding or brazing temperatures at approximately the same time.

2. The method of welding or brazing together flatwise metal pieces having different characteristics, which consists in holding the pieces together at the seam or joint between two electrodes, passing an electric current from one electrode to the other across the joint, the electrodes being so arranged and constructed that the current passing through them is made to impart different degrees of heat to the two electrodes, whereby the metal pieces at the joint are made to attain their respective welding or brazing temperatures by conduction of heat from the electrodes substantially as described, and maintaining pressure upon the pieces after the heating-current is turned off and until the joint is sufficiently cooled.

3. The method of welding or brazing together metal pieces having different characteristics, which consists in holding the pieces together at the seam or joint between two electrodes, passing an electric current from one electrode to the other across the joint, shunting a portion of the current through one of the pieces around the other piece and one of the electrodes whereby that electrode receives less heating-current than the other, and maintaining pressure upon the pieces after the heating-current is turned off and until the joint is sufficiently cooled.

4. The method of welding or brazing together metal pieces having different characteristics which consists in holding the pieces together at the seam or joint between two electrodes, passing an electric current from one electrode to the other across the joint, shunting a portion of the current through one of the pieces around the other piece and one of the electrodes whereby that electrode receives less heating-current than the other, providing means for varying and regulating the amount of current passing through the shunt-circuit, and maintaining pressure upon the pieces after the heating-current is turned off and until the joint is sufficiently cooled.

In testimony whereof we have affixed our signatures in presence of two witnesses.

DAVID W. PAYNE.
EUGENE DIVEN.

Witnesses:
A. S. DIVEN,
H. H. MILLS.